United States Patent [19]
Tanamura et al.

[11] Patent Number: 6,012,886
[45] Date of Patent: Jan. 11, 2000

[54] TOILET SEAT ATTACHMENT STRUCTURE

[75] Inventors: Yushi Tanamura, Toyota; Toshiyuki Torii, Kariya; Yuichi Shirase, Toyota, all of Japan

[73] Assignees: Nifco Inc., Yokohama; Aisin Seiki Kabushiki Kaisha, Kariya, both of Japan

[21] Appl. No.: 09/034,362

[22] Filed: Mar. 4, 1998

[30] Foreign Application Priority Data

Mar. 5, 1997 [JP] Japan ................................. 9-065625

[51] Int. Cl.[7] ............................ F16B 13/04; F16B 13/06; A47K 13/12
[52] U.S. Cl. ................................ 411/24; 411/26; 411/55; 4/236; 4/240
[58] Field of Search .................. 411/24, 26, 27, 411/28, 55; 4/236, 237, 240

[56] References Cited

U.S. PATENT DOCUMENTS

| | | | |
|---|---|---|---|
| 1,038,834 | 9/1912 | Bloom | 411/24 |
| 1,903,241 | 3/1933 | McIntosh | 411/24 |
| 3,091,990 | 6/1963 | McVittie | 411/27 |
| 3,911,782 | 10/1975 | Liebig | 411/24 |
| 5,256,016 | 10/1993 | Godfrey | 411/55 X |

*Primary Examiner*—Neill Wilson
*Attorney, Agent, or Firm*—Kanesaka & Takeuci

[57] ABSTRACT

A toilet seat attachment structure is used for attaching a toilet seat unit on a toilet bowl. The structure includes a bolt with an axis portion, an abutting member disposed around the axis portion, an expanding member situated adjacent to the abutting member, and a nut member situated adjacent to the expanding member and engaging the axis portion. The abutting member has a shaft portion with a through-hole, and a flange formed on an upper periphery of the shaft portion. The axis portion passes through the abutting member and the expanding member, and engages the nut member. A friction member is disposed outside the expanding member. When the bolt is rotated, the nut member ascends on the axis portion, so that the expanding member gradually expands the diameter. Accordingly, the frictional member is enlarged to frictionally engage with an attachment hole of a toilet bowl.

13 Claims, 17 Drawing Sheets

FIG. 11(a)
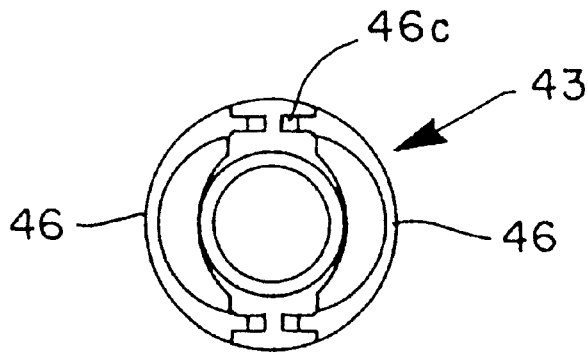
FIG. 11(b)   FIG. 11(c)
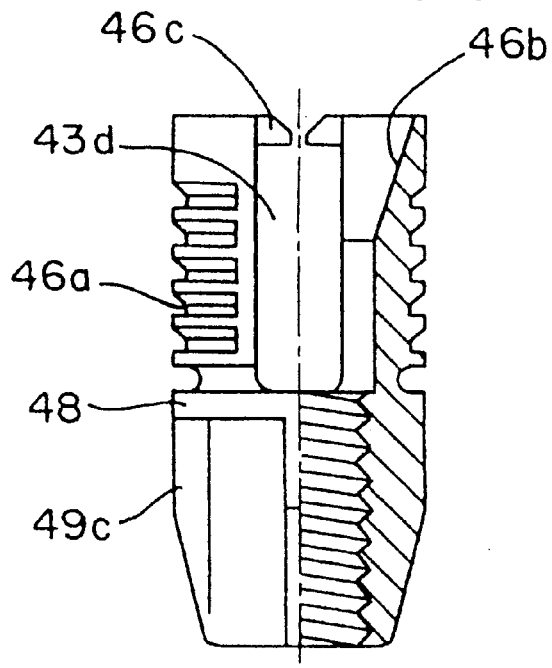
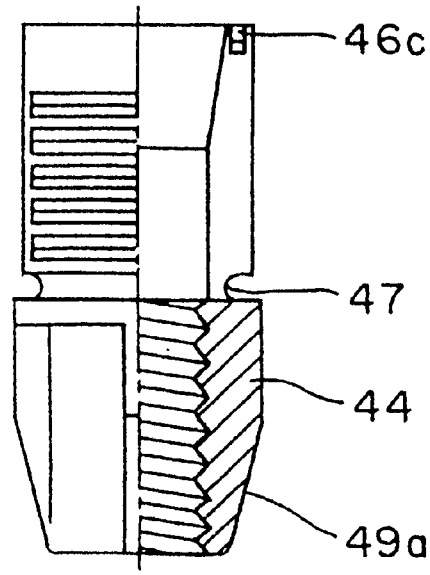
FIG. 11(d)
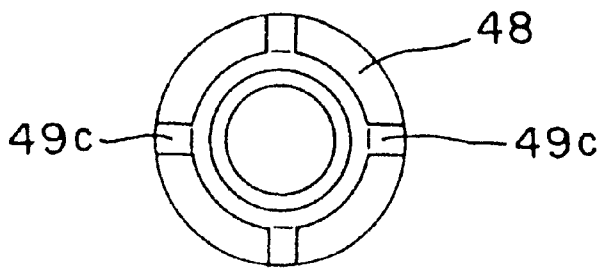

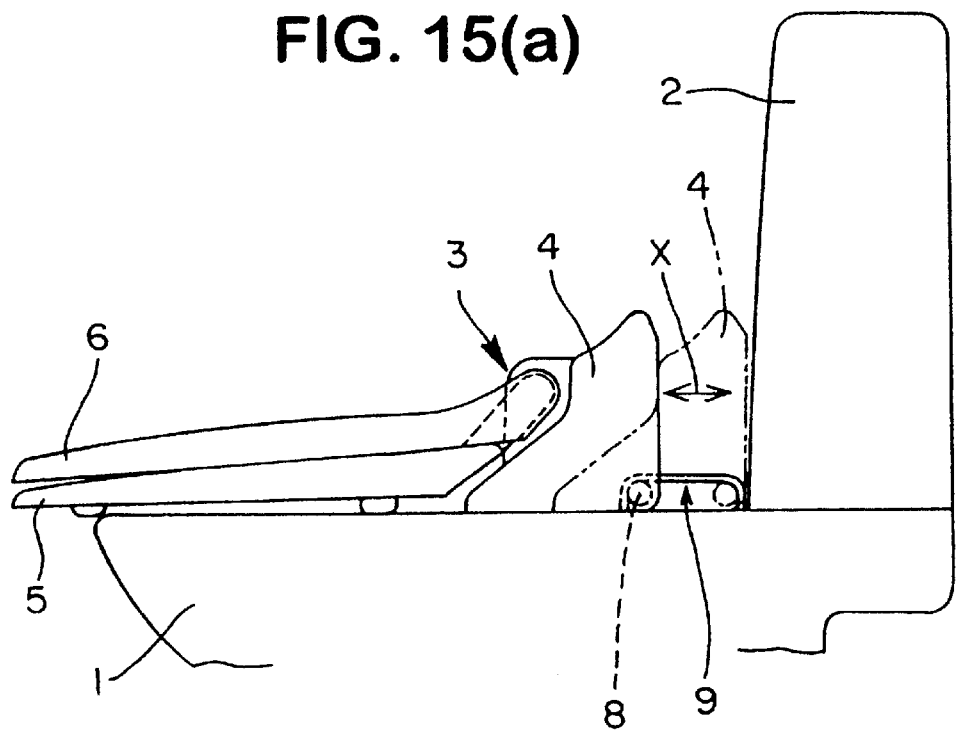
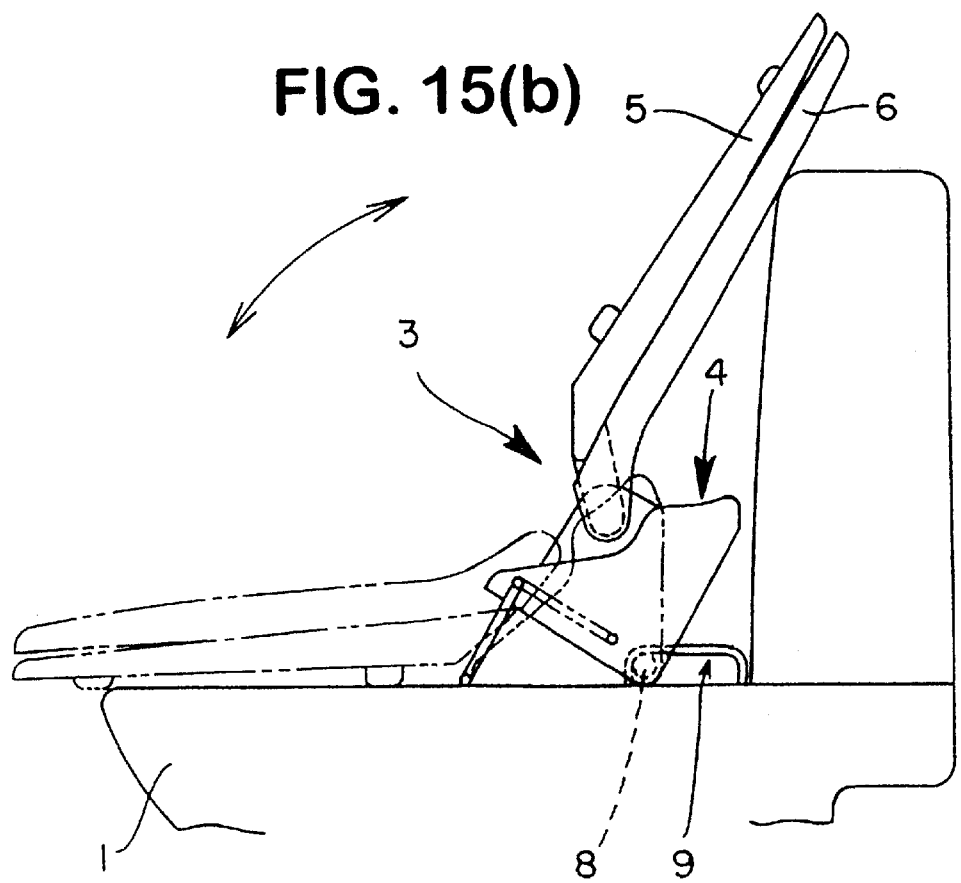

TOILET SEAT ATTACHMENT STRUCTURE

BACKGROUND OF THE INVENTION AND RELATED ART STATEMENT

The present invention relates to a toilet seat attachment structure for attaching a toilet seat unit to a toilet bowl.

Nowadays, various functions, such as heating, washing and drying, are incorporated into the toilet seat unit for a western style toilet bowl. Concerning that these functions are located in a toilet seat side, the toilet seat together with a lid thereof is formed as the toilet seat unit with various functions. As an attachment structure for the toilet seat unit, the toilet bowl is materially thick and an attachment portion thereof is also thick. Further, the toilet seat unit itself may be exchanged along with a maintenance checking or the like. Therefore, in view of the operation for attaching to the toilet bowl, and attachment and detachment operations of the toilet seat unit, and in view of the fixation strength and the like due to heavy weight with many functions, it is required to improve the toilet seat attachment structure.

FIG. 17(a) shows a conventional attachment structure for a toilet seat unit. Numeral 50 designates an attachment portion including an attachment hole 50a at a toilet bowl side, and numeral 51 designates an installation plate portion including an attachment hole 51a at a toilet seat unit side. In this structure, after positioning the toilet seat unit such that the attachment hole 51a is disposed on or adjusted to the attachment hole 50a, the unit is attached by using an exclusive fastening device 52.

As shown in FIG. 17(b), the fastening device 52 is formed of a bolt 53 made of metal, an expanding member 54 having an upper flange 54a, a nut 55 made of metal and integrally disposed in the expanding member 54, and a washer 56. The expanding member 54 is a rubber molded member, and a lower side of the flange 54a constitutes a substantially cylindrical shape. Also, there is provided a plurality of larger diameter portions 54b between an upper end and a lower end of the expanding member 54, and a range L including the large diameter portions 54b is a portion in which the diameter thereof exclusively expands. In the lower end of the expanding member 54, the nut 55 is inserted at the time of molding, and integrally disposed therein. In the above described members, an axis portion of the bolt 53 is inserted into a cylinder of the expanding member 54 through the washer 56, and is engaged with the nut 55 so as to constitute the integral fastening device 52.

In the attachment operation, the fastening device 52 is inserted from the installation plate portion 51 (an upper side of the toilet bowl) into the respective attachment holes 51a and 50a, and from a condition in which the flange 54a abuts against the installation plate portion 51 like a hanging condition, the bolt 53 is rotated. Accordingly, in the expanding member 54, the nut 55 ascends around the axis portion of the bolt 53 by a rotation of the bolt 53, so that the large diameter portions 54b are compressed to expand the diameter thereof to be pressed against the inner peripheral surface of the attachment hole 50a. The installation plate portion 51 of the toilet seat unit is attached by detachably engaging the attachment portion 50 of the toilet bowl by a pressing force of the fastening device 52. In this attachment structure, since the installing operation is carried out from the upper side of the toilet bowl, as compared to a structure, for example, as disclosed in Japanese Utility Model Publication (KOKAI) No. 59-64100, in which the nut is fastened around a bolt member from the lower side of the toilet bowl, workability is better, and appearance is superior since the fastening device is pressed against the inner peripheral surface of the attachment hole.

However, the conventional structure as shown in FIGS. 17(a) and 17(b) has the following problems, and it does not sufficiently satisfy the workability of the attachment, engagement strength, reliability and the like.

Firstly, in the attachment operation, the bolt 53 is rotated to move the nut 55 upwardly until the large diameter portions 54b of the expanding member 54 are pressed against the inner peripheral surface of the attachment hole 50a by the predetermined engaging and stopping force, but it is difficult to determine when tightening of the bolt 53 is to be finished. This is because the expanding member 54 is elongate and formed of a rubber material, so that it is easy for the nut 55 to ascend freely, and it can not be determined when the final tightening point, i.e. engaging and stopping force in the design, is reached. Thus, it likely happens that the bolt is fastened too much or insufficiently.

Also, the attachment portion 50 of the toilet bowl is thick because of the restriction of a material or the like, and in correspondence thereto, the length of the expanding member 54 is extended. Thus, in case the expanding member 54 is structured such that a plurality of large diameter portions 54b is disposed between the upper end of the expanding member and the lower end thereof, and the respective large diameter portions 54b are gradually compressed from the lower side to expand the diameter thereof by moving the nut 55 upwardly, a number of rotations of the bolt 53 is naturally increased, and it can not be expected that the respective large diameter portions 54b are deformed to expand the diameter in the same condition at the same time. Namely, the large diameter portions 54b can not provide the same pressing force. Normally, after the diameter at the large diameter portion 54b adjacent to the nut 55 is initially expanded in a certain degree, the diameter of the upper large diameter portion 54b is expanded, so that a stable engaging and stopping force as a whole can not be obtained. Incidentally, in the bolt 53 made of metal, there is a problem such as a rust, and by the structure in which the nut 55 is inserted into the expanding member 54, a manufacturing cost is increased.

The present invention has been made in view of the above described problems, and an object of the invention is to provide a toilet seat attachment structure, in which workability is good even at the small space, and a toilet seat unit can be attached to a toilet bowl by strong and stable engaging and stopping force.

Further objects and advantages of the invention will be apparent from the following description of the invention.

SUMMARY OF THE INVENTION

To achieve the aforementioned object, the present invention provides a toilet seat attachment structure, in which an installation plate is provided for attaching a toilet seat unit onto a toilet bowl, and attachment holes which are respectively formed in the toilet bowl and the installation plate are aligned. A fastening device is inserted into the attachment hole from an upper surface of the installation plate, and is engaged inside the attachment hole of the toilet bowl. In the toilet seat attachment structure of the invention, the fastening device is formed of a bolt; an abutting member including a flange abutting against the installation plate and disposed in an upper outer periphery of the abutting member, and a through-hole in the abutting member; an expanding member disposed around an axis of the bolt passing through the through-hole; and a nut member ascending to expand the diameter of the expanding member. Also, the attachment structure of the invention includes a soft friction member disposed between the expanding member and the inner peripheral surface of the attachment hole of the toilet bowl. The expanding member is pressed, through the friction member, against the inner surface of the attachment hole of the toilet bowl.

According to the above described structure, in the attachment operation, when the bolt is rotated, the nut member is moved upwardly, the diameter of the expanding member is expanded in a condition that the expanding member is sandwiched between the abutting member and the nut member. Thus, the diameter expansion force is applied to the friction member, and the expanding member is pressed, through the friction member, against the inner peripheral surface of the attachment hole of the toilet bowl. Therefore, in this structure, in case the attachment operation is carried out on the toilet bowl, the diameter expansion force of the expanding member is transmitted to the soft friction member, and the diameter expansion force is equalized planarly by the friction member, so that the pressing force can be applied to the inner peripheral surface in a wide and extensive state without forming the local expansion force. Incidentally, in the structure for attaching the toilet seat unit to the toilet bowl, it is preferable that, in view of attachment workability described later and appearance, a notch for storing the installation plate is provided at a lower part of the rear surface of the toilet seat unit, and by engaging a guide groove with axis portions, which are respectively formed in correspondence to the notch and the installation plate, the toilet seat unit is disposed slidably in the front and rear directions with respect to the toilet bowl.

The present invention includes the following embodiments.

Firstly, the respective members forming the fastening device are made of resin, and further, it is preferable that the expanding member and the nut member may be integrally formed by resin as an expanding member with a nut portion, as shown in FIG. 5. Secondly, the expanding member is formed of two or more pieces, and under a condition that slit portions are interposed between the pieces, the pieces are formed into an integral, substantially cylindrical shape. In this structure, furthermore, it is preferable that the abutting member integrally includes a guide piece disposed inside the slit portion, and in a condition that a distal end of the abutting member is inserted inside the expanding member, the guide piece is fitted with the slit portion to assemble the abutting member movably up and down. In this case, it is easy to expand the diameter of the respective pieces of the expanding member at the same time and same degree, so that the attachment workability and handling are improved.

BRIEF DESCRIPTION OF THE DRAWINGS

FIG. 8(*b*) is a front view;

FIG. 9(*b*) is a bottom view;

FIG. 10(*b*) is a half-cut front view; FIG. 10(*c*) is a half-cut side view; and FIG. 10(*d*) is a bottom plan view;

FIGS. 11(*a*) through 11(*d*) show an expanding member with the nut in the fastening device of FIG. 5, wherein FIG. 11(*a*) is a top plan view; FIG. 11(*b*) is a half-cut front view; FIG. 11(*c*) is a half-cut side view; and FIG. 11(*d*) is a bottom view;

FIG. 12(*b*) is a front view;

FIG. 13(*b*) is a front view thereof;

FIGS. 15(*a*) and 15(*b*) are side views of the toilet bowl with the toilet seat unit attached by the attachment structure of the invention;

FIG. 16(*b*) is a schematic sectional view taken along line 16(*b*)—16(*b*) in FIG. 14;

FIG. 17(*b*) is a perspective view of the conventional fastening device used in the toilet seat unit as shown in FIG. 17(*a*).

DETAILED DESCRIPTION OF PREFERRED EMBODIMENTS

Hereinafter, embodiments of the present invention will be explained by referring to the attached drawings. Incidentally, in the following two basic embodiments, only fastening devices are modified, and a toilet bowl, toilet seat unit and installation plate are substantially the same. Therefore, in the following description, firstly, a toilet bowl, toilet seat unit and installation plate using the attachment structure of the invention will be explained generally, and then two embodiments of the fastening device will be explained in detail. Finally, the attachment operations will be described.

Figure 14:
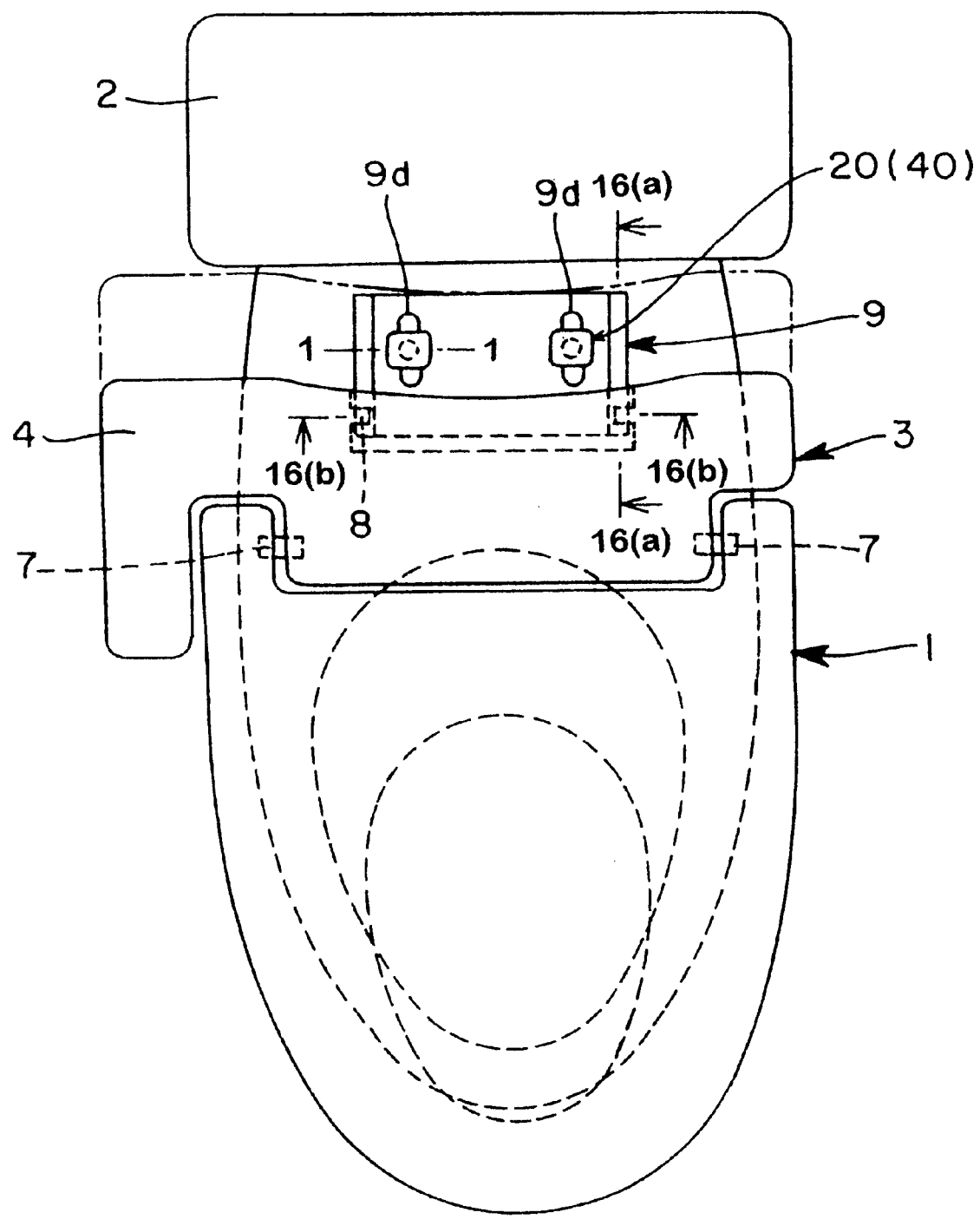
FIG. 14 is a plan view of a toilet bowl with a toilet seat unit attached by the attachment structure of the invention.

FIG. 14 shows a toilet bowl with a toilet seat unit using the attachment structure of the invention, as seen from a top; FIGS. 15(*a*) and 15(*b*) are side views of the toilet seat unit; FIG. 16(*a*) shows a schematic sectional view taken along line 16(*a*)—16(*a*) in FIG. 14; and FIG. 16(*b*) shows a schematic sectional view taken along line 16(*b*)—16(*b*) in FIG. 14.

Figure 16A:
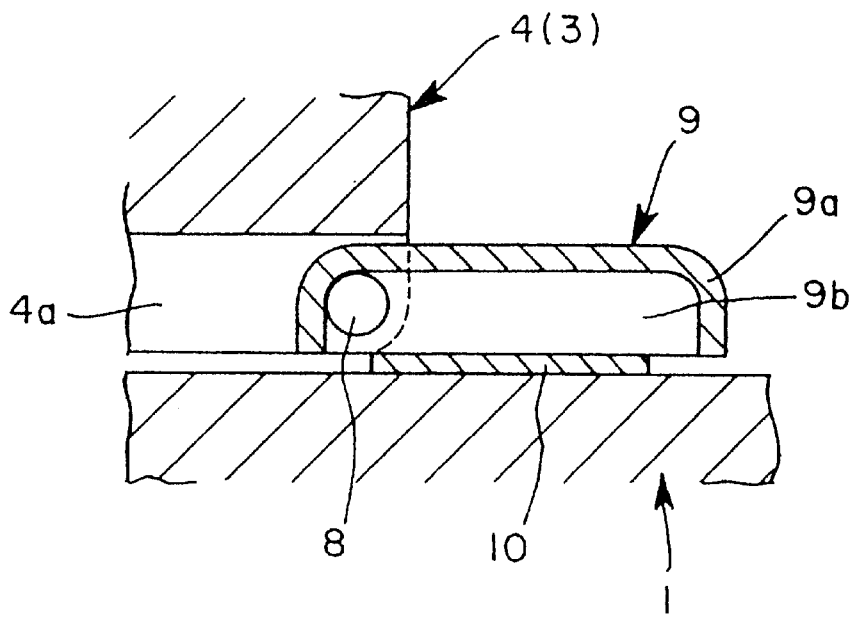
FIG. 16(*a*) is a schematic sectional view taken along line 16(*a*)—16(*a*) in FIG. 14.
Figure 16B:
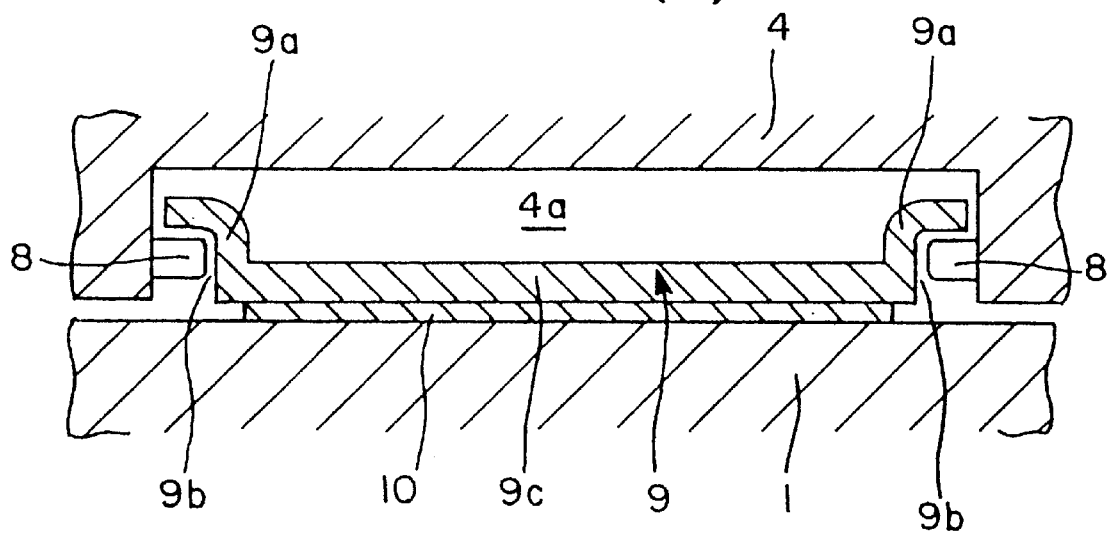
Figure 17A:
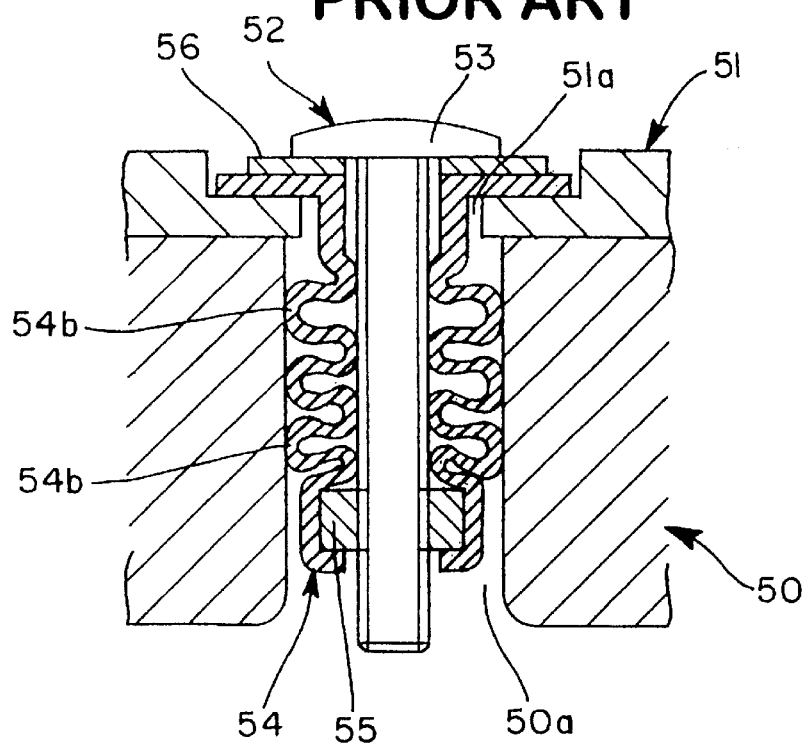
FIG. 17(*a*) is a sectional view of a conventional attachment structure for a toilet seat unit.
Figure 17B:
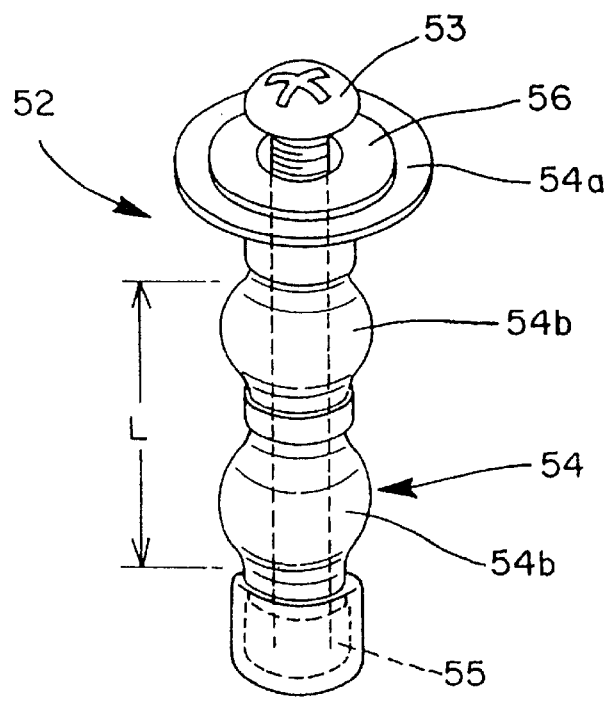

A toilet bowl 1 is a western style. On the toilet bowl 1, a reservoir 2 is disposed at a rear side, and in front of the reservoir 2, a toilet seat unit 3 is attached by the attachment structure of the invention. The toilet seat unit 3 includes a main body 4 disposed in a width direction of the toilet bowl 1, and a toilet seat 5 with a built-in heating mechanism or the like and a lid 6 are attached respectively by a pair of axes 7 so as to freely open and close with respect to the main body 4. The main body 4 is provided with a washing mechanism or the like (not shown), and includes a notch 4a which is opened at a lower side of a rear surface thereof as shown in FIGS. 16(a) and 16(b). The notch 4a has a size for nearly storing an installation plate 9 which attaches the toilet seat unit 3 to the toilet bowl 1, and on the side surfaces of the notch 4a facing each other, axes 8 are disposed to project and face each other.

Figure 1:
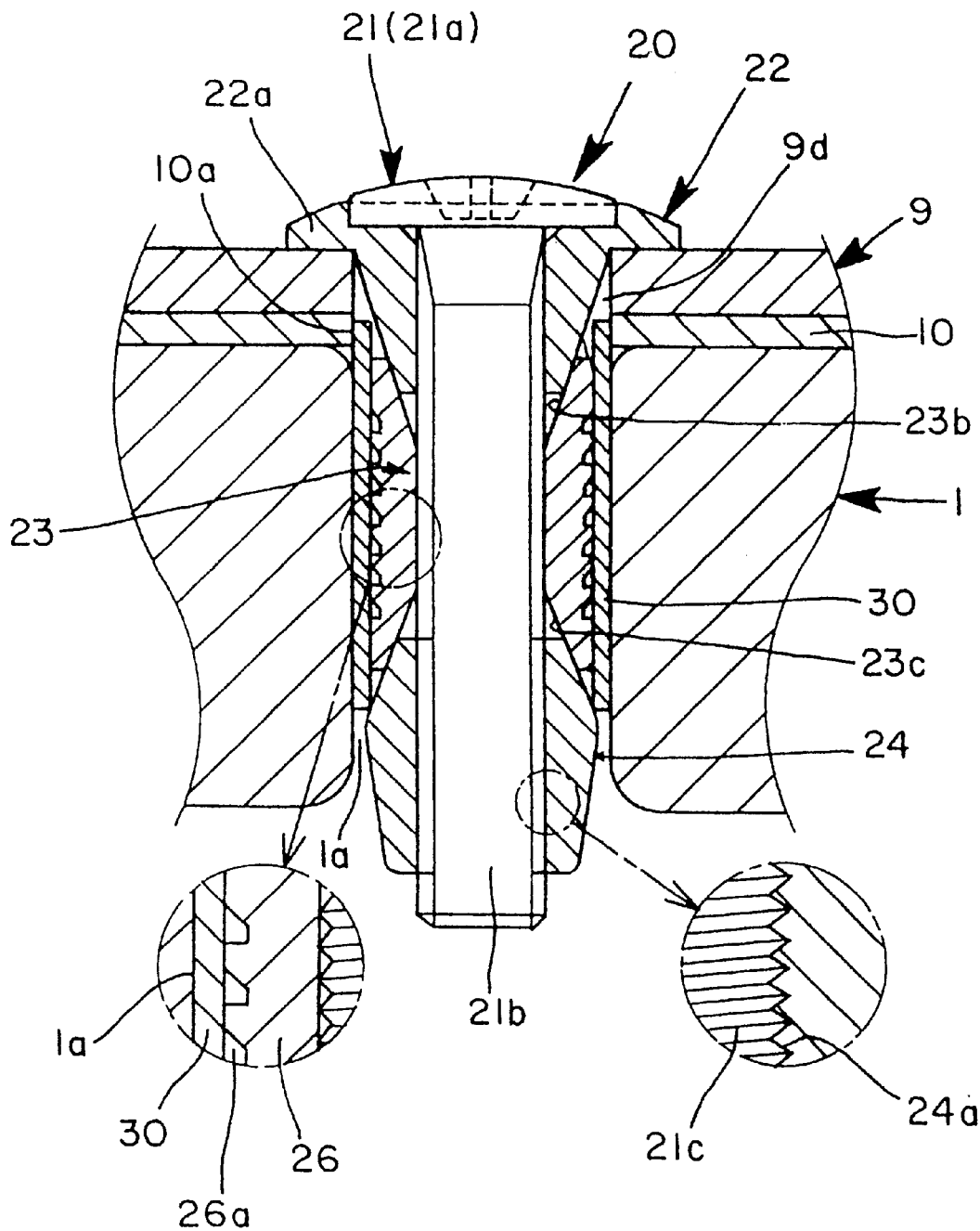
FIG. 1 is an enlarged sectional view taken along line 1—1 in FIG. 14, showing an attachment structure of the present invention.
Figure 5:
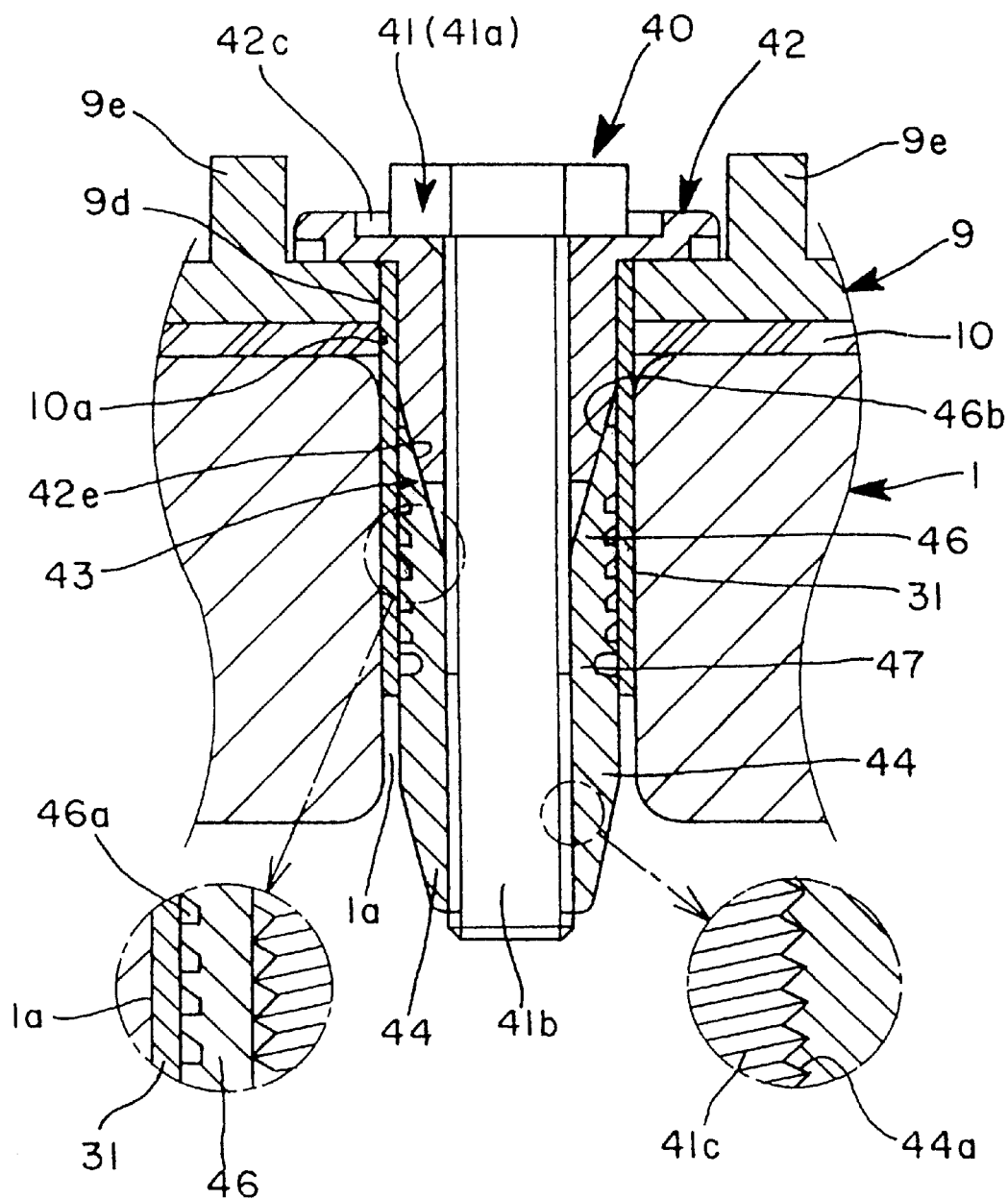
FIG. 5 is an enlarged sectional view for showing another embodiment of the attachment structure according to the present invention, which corresponds to FIG. 1.

Here, the installation plate 9 has a shape of a substantially rectangular plate, and both sides thereof are provided with standing walls 9a disposed to face each other. On each outer surface side of the standing wall 9a, there is disposed a guide groove 9b such that a dent is formed except for both sides and an upper side. The corresponding axes 8 are able to fit from both sides of the installation plate 9. On the other hand, a portion 9c between the standing walls 9a has a plate shape, and is provided with attachment holes 9d to correspond to attachment holes 1a formed in an attachment portion (normally, a front portion of the toilet bowl) of the toilet bowl 1 as shown in FIG. 1. The attachment hole 1a is a round hole. The attachment hole 9d has a width approximately the same as the diameter of the attachment hole 1a and is elongated in front and rear directions, to constitute a slit hole. Incidentally, in the above described installation plate 9, as shown in FIG. 5, there can be provided with a pair of rotation-preventing standing walls 9e to correspond to a position of a fastening device 40.

In the above described structure, the attachment holes 1a and the attachment holes 9d are provided at two locations, and the toilet seat unit 3 is to be attached to the toilet bowl 1 by using two fastening devices 20 (or 40), described later. However, a number of the fastening devices to be used is discretionary. Also, in case the toilet seat unit 3 is disposed on the toilet bowl 1, for example, the installation plate 9 is arranged with respect to the notch 4a such that the respective axes 8 are located inside the corresponding guide grooves 9b as shown in FIG. 16(b), and from this condition, the toilet seat unit 3 is placed on the attachment portion of the toilet bowl 1 by interposing the installation plate 9 therebetween.

Also, in this embodiment, an absorbing or buffer member 10 is disposed between the installation plate 9 and the toilet bowl 1. The absorbing member 10 has holes 10a corresponding to the attachment holes 9d as shown in FIG. 1, and is preferably fixed to the installation plate 9 in advance by an adhesive or the like in a condition that the attachment holes 9d and the holes 10a are aligned. The toilet seat unit 3 is disposed such that the attachment holes 9d are aligned with the attachment holes 1a. Incidentally, in the aforementioned attachment structure of the toilet seat unit 3, in case a degree of fitting of the axes 8 with the guide grooves 9b is comparatively loose, it is possible that after the installation plate 9 is attached in advance to the toilet bowl 1 by using the fastening device 20 (or 40), the axes 8 corresponding to the both guide grooves 9b are operated to fit therein, so as to attach the toilet seat unit 3.

FIG. 14 through FIG. 16(b) show a condition after the toilet seat unit 3 is attached to the toilet bowl 1 by the installation plate 9 and the fastening devices 20 (or fastening devices 40). In this condition, the respective axes 8 are fitted into the guide grooves 9b, wherein an upper surface of the toilet bowl or the absorbing member 10 is located under the guide grooves 9b. Thus, the toilet seat unit 3 as a whole is movable in X arrow directions in FIG. 15(a). When the toilet seat unit 3 is transferred to a position of two-dotted line in FIG. 15(a), the installation plate 9 is nearly retained in the notch 4a of the main body 4, and becomes invisible. This condition is a normal use condition where the attachment of the toilet seat unit is finished and a user can use the toilet bowl, and the front and rear movements of the toilet seat unit 3 are controlled by a lock mechanism (not shown). Also, in a condition that the toilet seat 5 and the lid 6 are rotated to an open direction as shown in FIG. 15(b), the main body 4 is rotatable by means of the axes 8 in a direction such that one side of the main body 4 is lifted from an upper surface of the toilet bowl 1.

The above described attachment structure for the toilet seat unit 3 has the following advantages.

The toilet seat unit 3 includes the notch 4a at the lower side of the rear surface thereof for storing the installation plate 9, and is structured such that by fitting or engaging the guide grooves 9b with the axes 8, which are provided to respectively correspond to sides of the notch 4a and sides of the installation plate 9, the toilet seat unit 3 is attached to the toilet bowl 1 to slidably move in the front and rear directions. Thus, for example, in case of attaching the toilet seat unit 3 to the toilet bowl 1, in a condition where the installation plate 9 is largely projected in the rear surface side of the toilet seat unit 3 as shown by a solid line in FIG. 15(a), attachments of the fastening devices 20 (40) and the attachment and detachment operations thereof can be efficiently carried out even in the small place; and also, thereafter, when the toilet seat unit 3 is transferred to the position of the two-dotted line in FIG. 15(a), the installation plate 9 and the fastening devices 20 (40) become invisible or unseen, so that the appearance of the toilet bowl 1 in the normal use condition can be improved.

Figure 2:
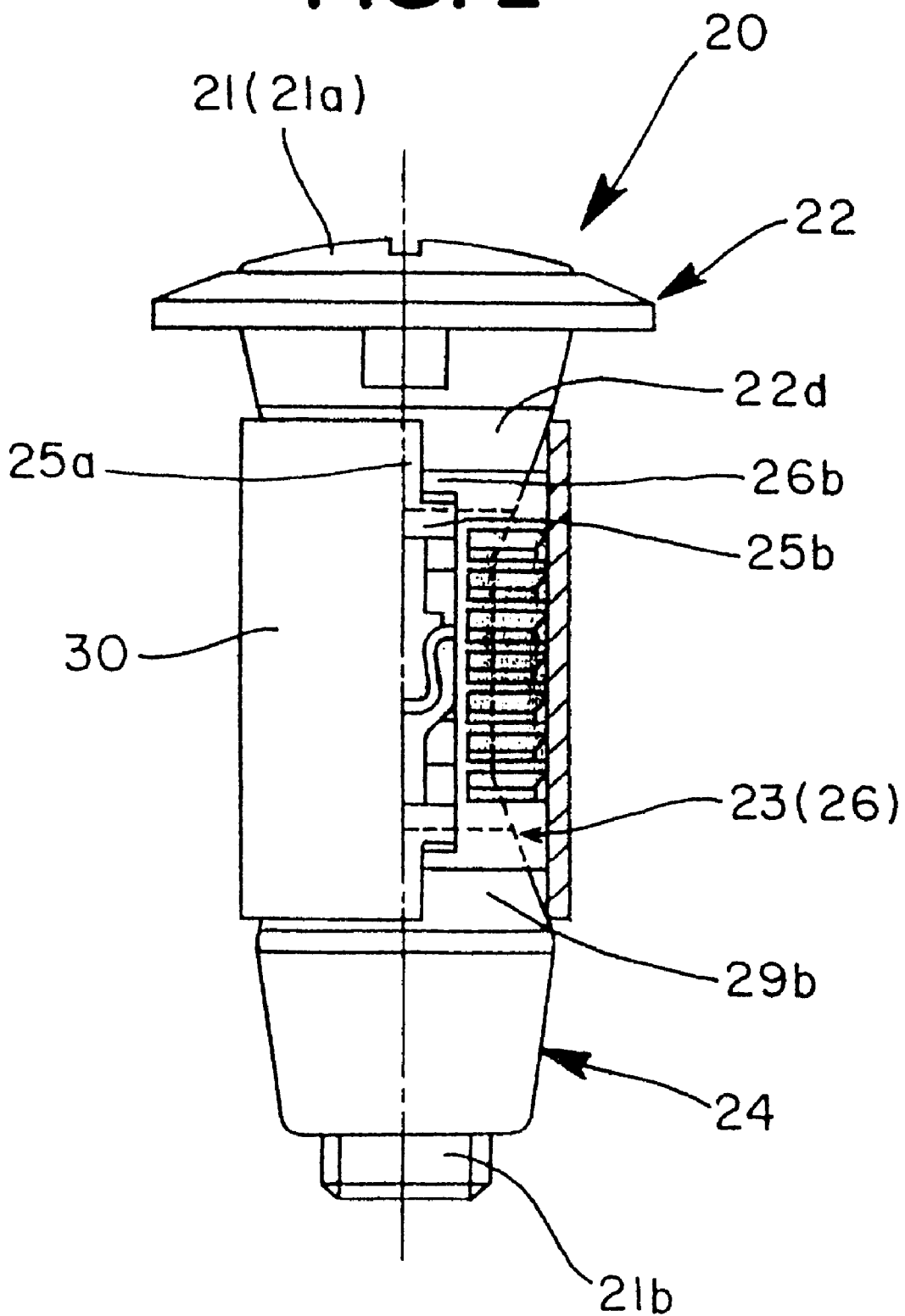
FIG. 2 is a partly cut side view of a fastening device used in FIG. 1.
Figure 3:
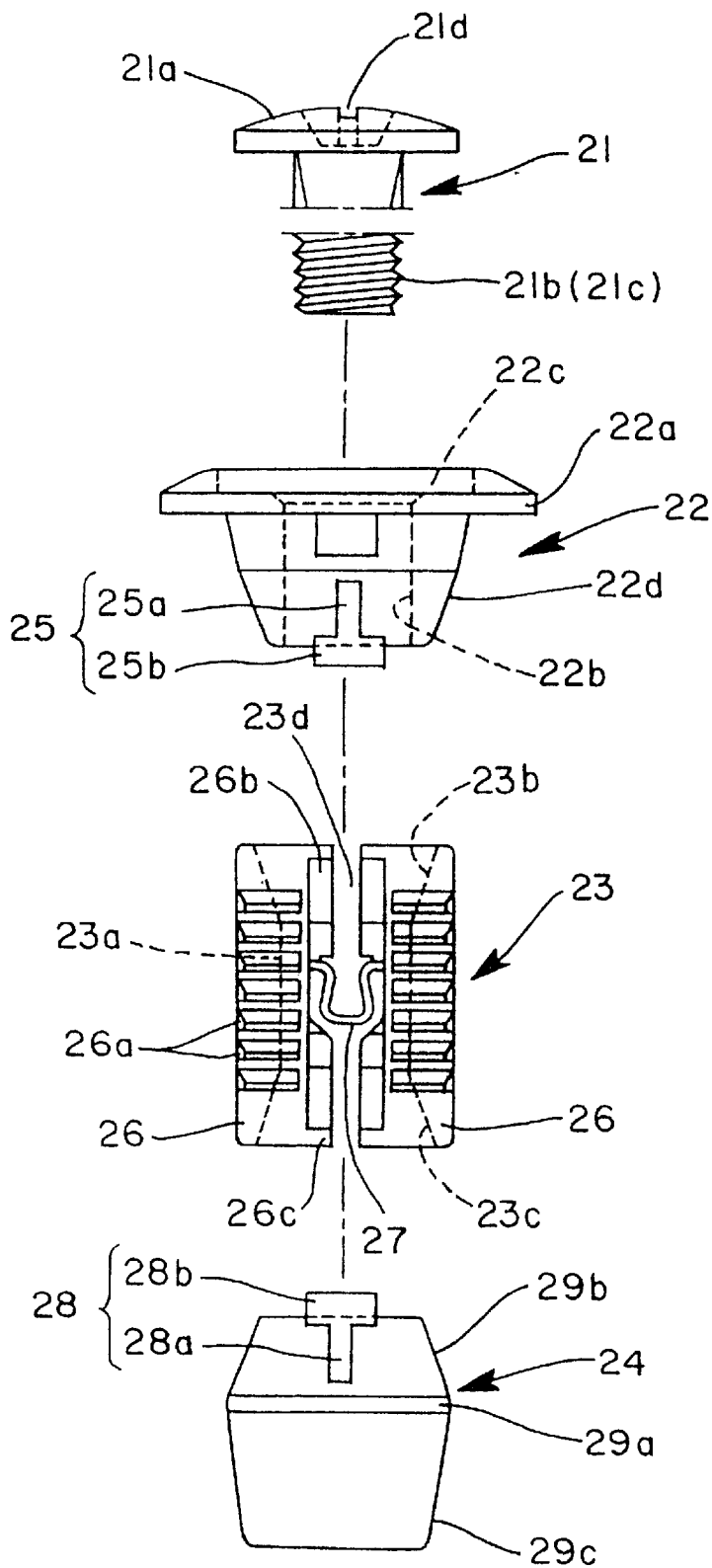
FIG. 3 is an exploded perspective view showing relations of members of the fastening device of FIG. 2.
Figure 4:
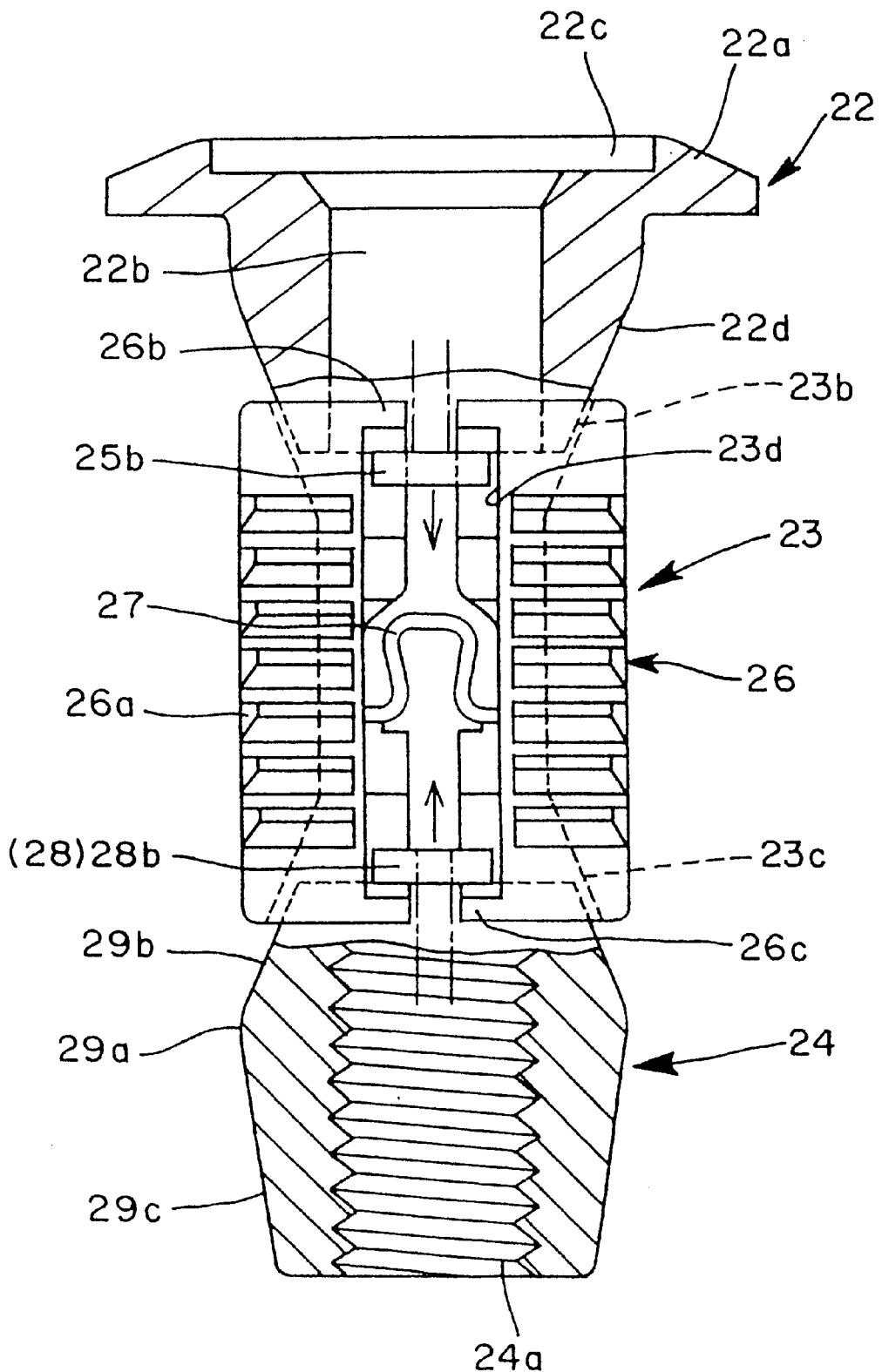
FIG. 4 is a partly cut side view showing relations of main members of the fastening device.

FIG. 1 through FIG. 4 show the fastening device 20, wherein FIG. 1 is an enlarged sectional view showing a condition that the toilet seat unit is attached by using the fastening device 20; FIG. 2 is a partly cut front view of the fastening device 20 used in FIG. 1; FIG. 3 shows a relation of the members forming the fastening device 20; and FIG. 4 show the relations among an abutting member, an expanding member and a nut member forming the fastening device 20. Incidentally, in FIG. 4, the abutting member and the nut member are shown in sectional views, and the expanding member is shown in a front view.

The fastening device 20 of the first embodiment is formed of a bolt 21, the abutting member 22 through which an axis portion 21b of the bolt 21 passes, an expanding member 23 and a nut member 24, through which the axis portion 21b passing through the abutting member 22 passes, and a friction member 30 disposed on an outer periphery of the expanding member 23.

The bolt 21, the abutting member 22, the expanding member 23 and the nut member 24 are formed by resin moldings, and especially, they are formed of polypropylene resin which is strong against a toilet cleaner or detergent, or in view of the strength, a compound reinforced resin such as polypropylene including glass fibers. On the other hand, the friction member 30 is a rubber molded member having a frictional resistance, but it can be formed by a soft resin such as elastomer.

Here, the bolt 21 includes a round head 21a and the axis portion 21b, and a male thread 21c is incised in the axis portion 21b. The head 21a is provided with an engaging groove 21d for a turning tool. The axis portion 21b is slightly longer than a total size of the thicknesses of the installation plate 9 and the absorbing member 10, and the thickness of the attachment portion (depth of the attachment hole 1a) of the toilet bowl 1.

In the abutting member 22, a flange 22a in a collar shape is provided on an upper outer periphery of the cylindrical shape, and an inner periphery of the abutting member 22 is provided with a through hole 22b with an inner diameter such that the axis portion 21b freely passes. On an inner side of the flange 22a, there is provided a dent 22c which receives the head 21a. An outer peripheral shape of the cylindrical portion located below the flange 22a is tapered to reduce the diameter toward a lower end, and becomes an inclined outer surface 22d with a tapered lower end. Also, on the inclined outer surface 22d, a pair of guide projection pieces 25 is provided to orient in the opposite directions. Also, each guide projection piece 25 is formed of a vertical portion 25a integrally formed with the inclined outer surface 22d, and a horizontal portion 25b integrally formed with a lower end of the vertical portion 25a such that a part of the horizontal portion 25b projects from the lower end of the abutting member 22.

The expanding member 23 is integrally formed as a substantially cylindrical shape such that two pieces 26 are disposed to face each other while keeping spaces (slit portions) 23d therebetween, and the pieces 26 are coupled by connection pieces 27. An inner periphery of the expanding member 23 is formed to have a size such that the axis portion 21b passes therethrough, wherein an intermediate portion defined by the both pieces 26 is the smallest inner diameter 23a, and upper and lower portions for the intermediate portion are formed as inclined inner surfaces 23b, 23c in a bowl shape such that diameters thereof are increased toward the respective ends. These are designed such that the inclined outer surface 22d at the lower side of the abutting member 22 is located inside the inclined inner surface 23b to push outwardly by a wedge action, and an inclined outer surface 29b, which tapers toward an upper side, of the nut member 24 is located inside the inclined inner surface 23c to push outwardly by a wedge action. The spaces or slit portions 23d have sizes capable of receiving the vertical portions 25b of the guide projection pieces 25 to be freely movable up and down or vertically, and the connection pieces 27 are formed in a substantially U-shaped thin thread to allow the pieces 26 to expand outwardly.

Also, on an outer periphery of each piece 26, a plurality of outer peripheral grooves 26a having a substantially U or V-shaped section is disposed in the vertical direction so as to engage the inner surface of the friction member 30. On the facing sides of the respective pieces 26, projections 26b are protruded to face each other at the upper ends thereof, and projections 26c are protruded to face each other at the lower ends thereof.

The inner periphery of the nut member 24 is provided with a female thread 24a which fits and engages the male thread 21c of the axis portion 21b. The outer peripheral shape of the nut member 24 is formed such that an intermediate portion 29a has a larger diameter than the largest diameter of the inclined inner surface 23c; an upper portion of the nut member 24 is formed as an inclined outer surface 29b in a bowl shape having a tapered upper end such that the upper portion is partly inserted inside the inclined inner surface 23c; and a lower portion is formed as an inclined outer surface 29c having a slope gentler than that of the inclined outer surface 29b. Also, on the inclined outer surface 29b, a pair of guide projection pieces 28 is provided to orient in the opposite directions. Each guide projection piece 28 is formed of a vertical portion 28a integrally formed with the inclined outer surface 29b, and a horizontal portion 28b integrally formed with an upper end of the vertical portion 28a such that a part of the horizontal portion 28b projects from the upper end.

On the other hand, the friction member 30 is formed into a cylindrical shape having an inner diameter such that the expanding member 23 can be freely inserted, and the entire length of the friction member 30 is slightly longer than the expanding member 23.

The above described fastening member 20 is formed integrally by assembling the respective members before it is supplied to the attachment process of the toilet seat unit 3. An example of this assembling operation will be generally explained.

In case the inclined outer surface 22d of the abutting member 22 is inserted inside the inclined inner surface 23b of the expanding member 23, a pair of guide projection pieces 25 is elastically deformed outwardly and inserted into the corresponding upper portions of the spaces 23d. Accordingly, in a condition that the vertical portions 25a are located respectively between the projections 26b, the projections 26b prevent the horizontal portions 25b from being pulled out, so that the abutting member 22 is assembled to be slightly movable up and down. By the similar procedures, in case the inclined outer surface 29b is inserted inside the inclined inner surface 23c with respect to the expanding member 23, a pair of guide projections 28 is elastically deformed outwardly and inserted into the corresponding lower portions of the spaces 23d. Accordingly, in a condition that the vertical portions 28a are located respectively between the projections 26c, the projections 26 prevent the horizontal portions 28b from being pulled out, so that the nut member 24 is assembled to be slightly movable up and down.

Incidentally, in this case, it is preferable that the friction member 30 is attached from the condition in FIG. 4. Also, the bolt 21 is inserted in a condition shown in FIG. 4 such that the axis portion 21b passes through the through-hole 22b and the inner periphery of the expanding member 23 (inclined inner surface 23b, inner diameter 23a and inclined inner surface 23c), and slightly engages the female thread 24a.

Figure 6:
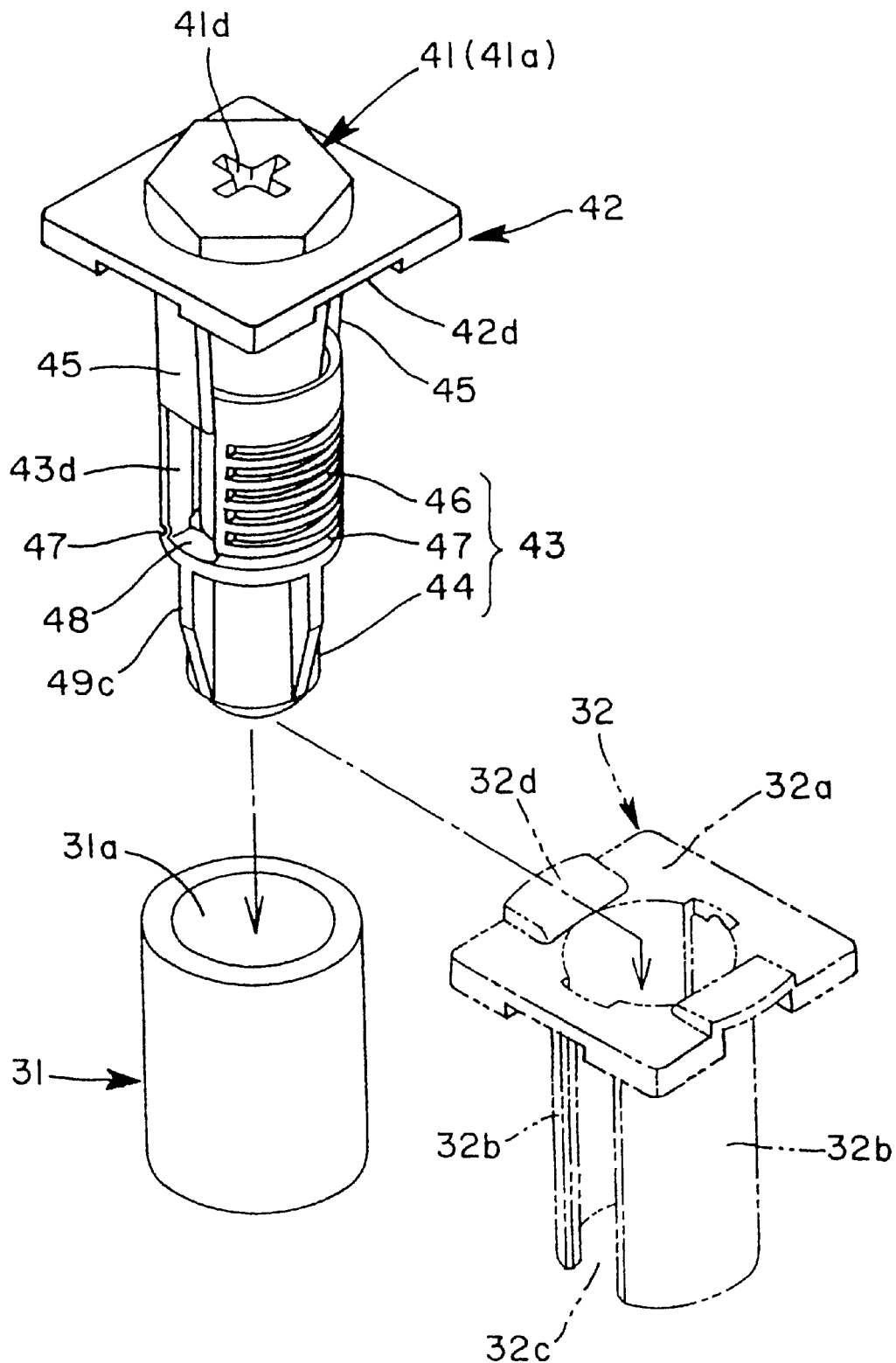
FIG. 6 is a schematic perspective view showing a relation of the fastening device with a friction device shown in FIG. 5.
Figure 7:
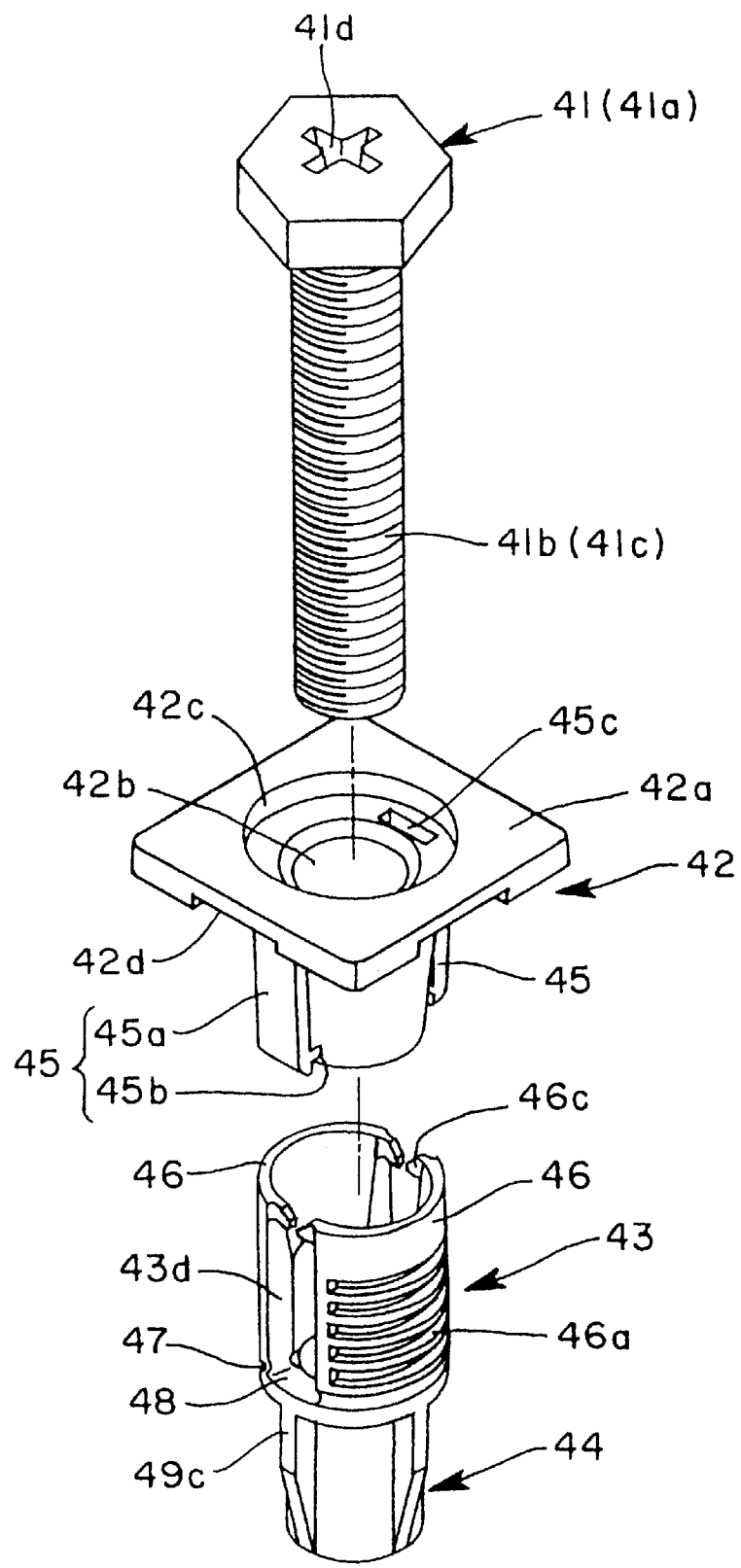
FIG. 7 is a schematic exploded perspective view showing relations of the main members of the fastening device shown in FIG. 5.
Figure 8A:
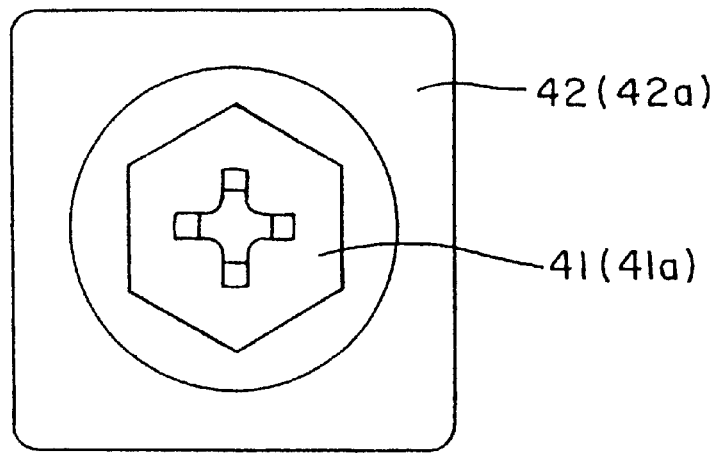
FIGS. 8(*a*) and 8(*b*) show a fastening device of FIG. 5, wherein FIG. 8(*a*) is a top plan view.
Figure 8B:
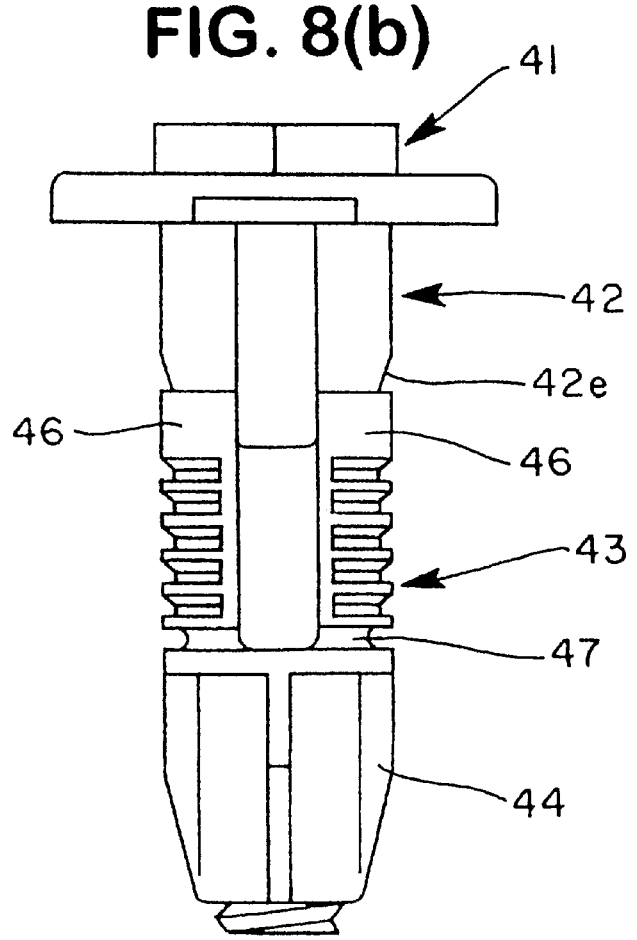
Figure 9A:
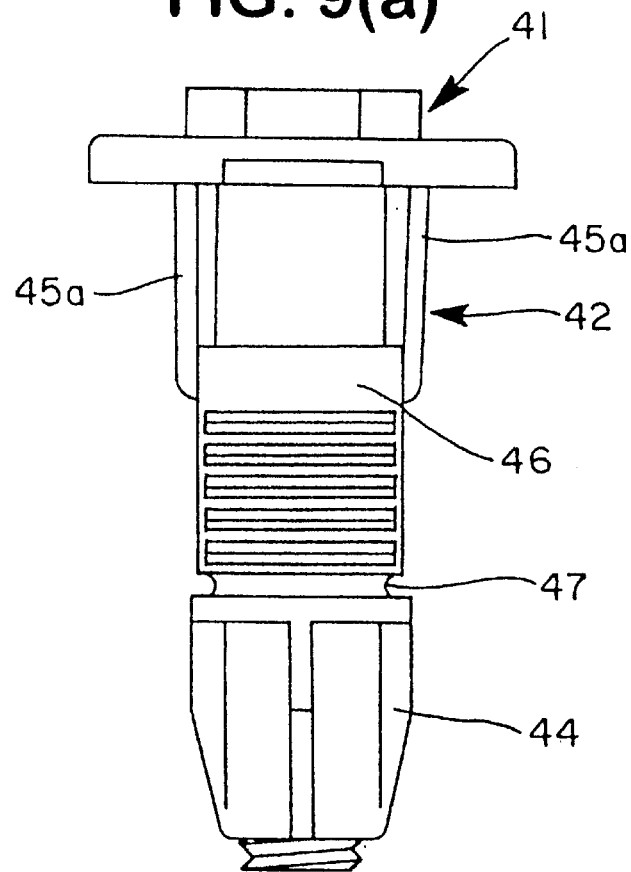
FIGS. 9(*a*) and 9(*b*) show the fastening device of FIG. 5, wherein FIG. 9(*a*) is a side view.
Figure 9B:
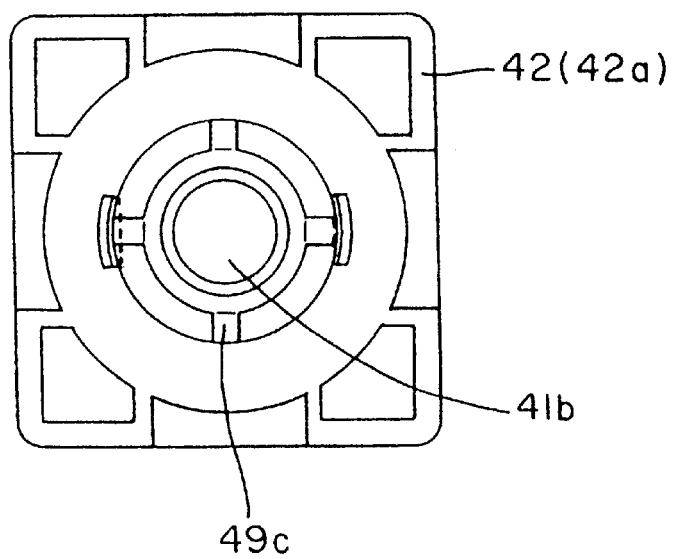
Figure 10A:
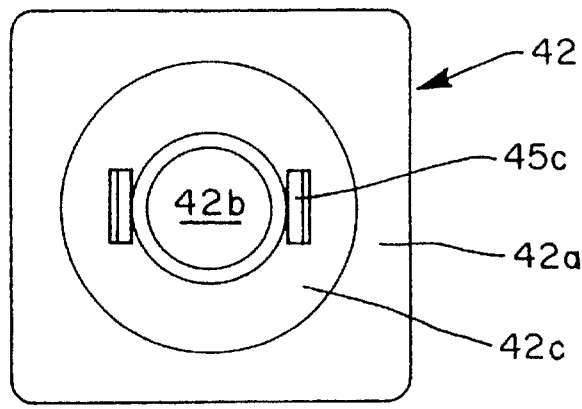
FIGS. 10(*a*) through 10(*d*) show an abutting member in the fastening device of FIG. 5, wherein FIG. 10(*a*) is a top plan view.
Figure 10B:
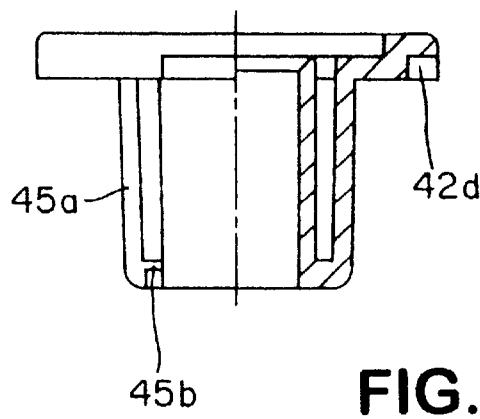
Figure 10C:
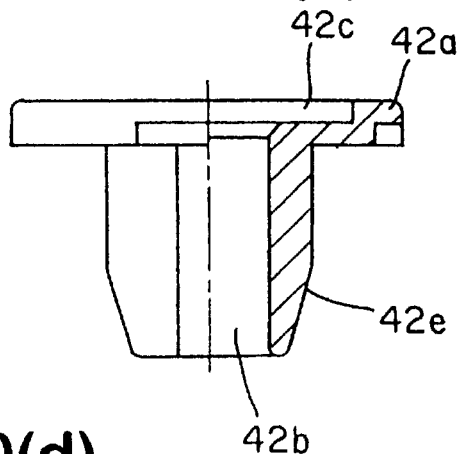
Figure 10D:
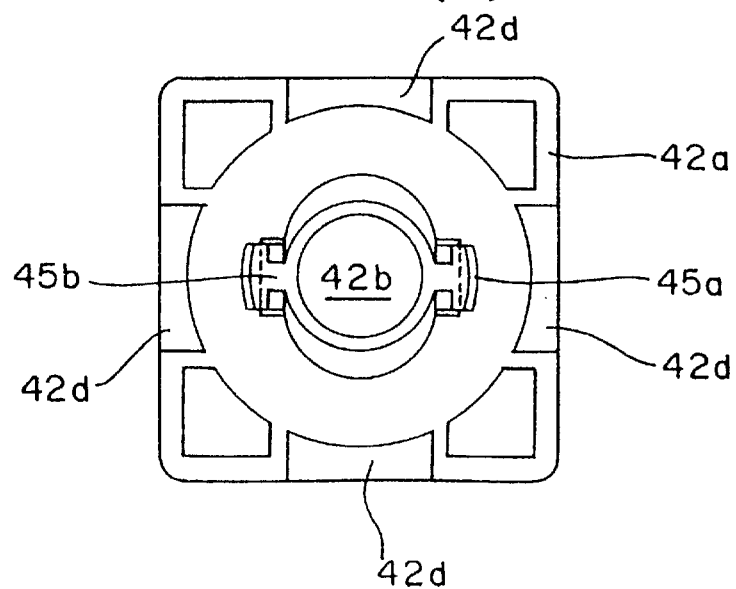
Figure 12A:
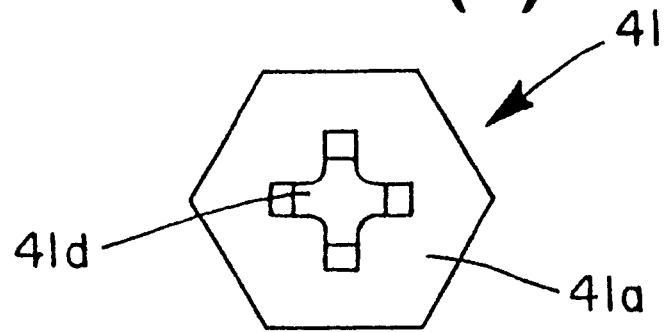
FIGS. 12(*a*) and 12(*b*) show a bolt of the fastening device of FIG. 5, wherein FIG. 12(*a*) is a top plan view.
Figure 12B:
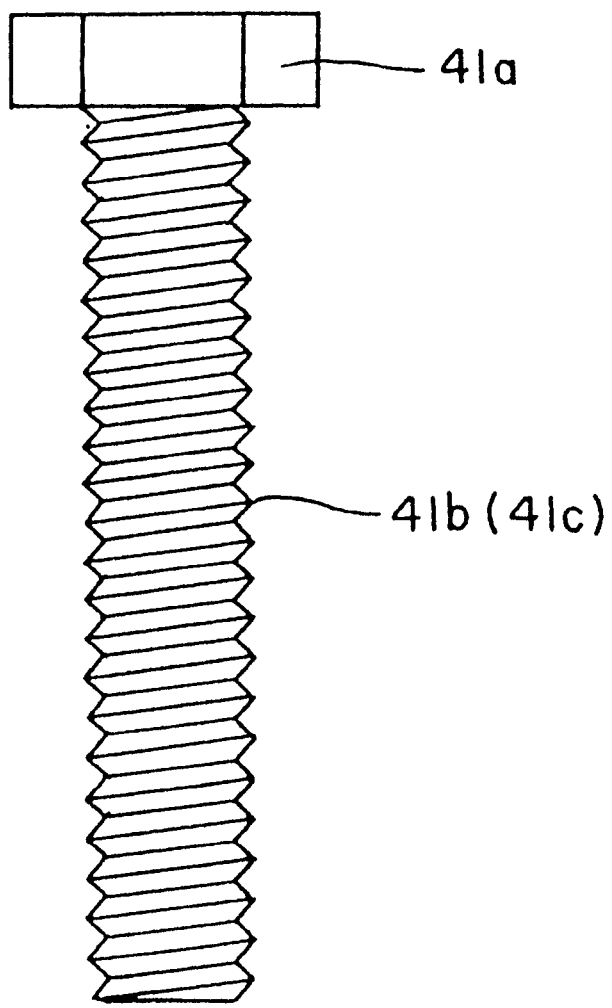
Figure 13A:
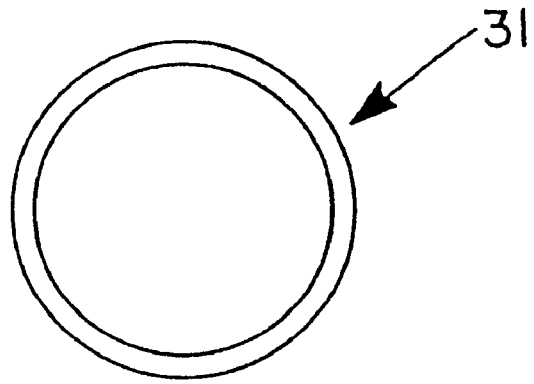
FIGS. 13(*a*) and 13(*b*) show a friction member of the fastening device of FIG. 5, wherein FIG. 13(*a*) is a top plan view thereof.
Figure 13B:
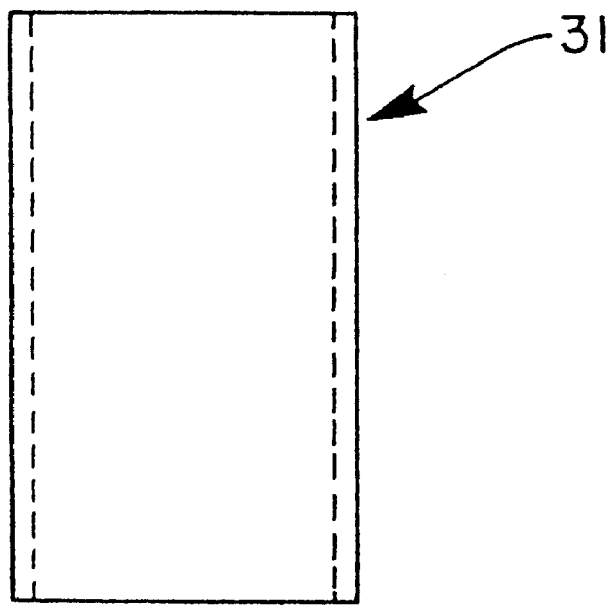

FIG. 5 through FIG. 13(b) show the fastening device 40, wherein FIG. 5 is an enlarged sectional view showing a condition that a toilet seat unit is attached by using the fastening device 40; FIG. 6 shows a relation between the fastening device 40 used in FIG. 5 and the friction member 31; and FIG. 7 shows a relation among the members forming the fastening device 40. FIGS. 8(a) and 8(b) are views of the fastening device 40, respectively, as seen from a top and a front, and FIGS. 9(a) and 9(b) are views of the fastening device 40, respectively, as seen from a side and a bottom. FIGS. 10(a) through 10(d) are views of an abutting member forming the fastening device 40 as seen from a top, a front (half sectional view), a side (half sectional view), and a bottom. FIGS. 11(a) through 11(d) are views of an expanding member with the nut, as seen from a top, a front (half section view), a side (half sectional view), and a bottom. FIGS. 12(a) and 12(b) are views of the bolt as seen from a top and a front. FIGS. 13(a) and 13(b) are views of a friction member as seen from a top and a front.

The fastening device 40 of the second embodiment is especially different from the first embodiment in that the expanding member and the nut member are formed integrally. The fastening device 40 is formed of a bolt 41; an abutting member 42 through which an axis portion 41b of the bolt 41 passes; and an expanding member 43 with a nut portion 44. Further, it includes a friction member 31 disposed on an outer periphery of the expanding member 43.

Incidentally, the bolt 41, the abutting member 42, and the expanding member 43 are formed by resin molding, and especially, formed of polypropylene resin which is strong against a toilet cleaner or detergent, or in view of the strength, a compound reinforced resin such as polypropylene including glass fibers. On the other hand, the friction member 31 is a rubber molded member having a frictional resistance, and can be formed by a soft resin.

Here, the bolt 41 includes a hexagonal head 41a and the axis portion 41b, and a male thread 41c is incised in the axis portion 41b. The head 41a is provided with an engaging groove 41d for a turning tool. The axis portion 41b is slightly longer than a total size of the thicknesses of the installation plate 9 and the absorbing member 10, and the thickness of the attachment portion (depth of the attachment hole 1a) of the toilet bowl 1.

In the abutting member 42, a flange 42a in a collar shape is provided on an upper outer periphery with the cylindrical shape, and an inner periphery of the abutting member 42 is provided with a through hole 42b with an inner diameter such that the axis portion 41b freely passes. The flange 42a has a rectangular shape, but can be a circular shape. An inside of the flange 42a is provided with a concave 42c for receiving the head 41a, and on the lower surface side of the flange 42a, dents 42d are provided at four locations at 90 degrees spaced apart from each other. An outer peripheral shape of the cylindrical portion located below the flange 42a is tapered to reduce the diameter toward a lower end, and becomes an inclined outer surface 42e with a tapered lower end. Also, on an outer periphery including the inclined outer surface 42e, a pair of guide projection pieces 45 is provided to orient in the opposite directions. Each guide projection piece 45 is formed of a vertical portion 45a in which an upper end thereof is connected to the lower surface of the flange 42a and a lower end thereof extends to a lower end of the inclined outer surface 42e; and a connection portion 45b by which a lower portion of the vertical portion 45a is integrally connected to the inclined outer surface 42e to secure a space therebetween. Incidentally, numeral 45c is a rapping hole.

The expanding member 43 with the nut portion 44 is structured such that two portions 46 form an expanding portion at an upper side of the expanding member 43, and lower portions of the both portions 46 are integrally formed with the nut portion 44 in a cylindrical shape. Both portions 46 are coupled to the nut portion 44 by thin hinge portions 47, and constitute substantially a cylindrical shape such that slit portions 43d are interposed between the portions 46. Inner peripheries formed by the portions 46 have a size such that the axis portion 41b can pass therethrough, and upper portions of the inner peripheries are formed to have inclined inner surfaces 46b in a bowl shape having a diameter increasing toward a corresponding upper end surface. This structure is provided so that the inclined outer surface 42e at the lower side of the abutting member can be inserted inside the inclined inner surfaces 46b to push outwardly by a wedge action.

On outer peripheries of the pieces 46, outer peripheral grooves 46a having substantially U or V-shaped sections are disposed plurally in the vertical direction so as to engage the inner surface of the friction member 31. At upper ends of facing parts of the respective pieces 46, projections 46c are respectively protruded to face each other. The slit portion 43d has a groove width for receiving the guide projection piece 45 to be freely moveable up and down or vertically.

The inner periphery of the nut portion 44 includes a female thread 44a which fits and engages the male thread 41c of the axis portion 41b. An outer peripheral shape of the nut portion 44 is formed such that a flange 48 is provided at the upper end and coupled with the pieces 46 such that the thin hinges 47 are placed on an end surface of the flange 48, and a part below a middle part of the nut portion 44 is formed as a gently inclined outer surface 49a tapering downwardly. Also, on the outer periphery of the nut portion 44, ribs 49c are provided to equally divide the outer periphery into four, and to extend from the flange 48 to the lower end vertically.

On the other hand, the friction member 31 is formed into a circular shape having an inner diameter such that the expanding member 43 can be freely introduced therein, and the entire length is to cover the pieces 46 of the expanding member 43 and the abutting member 42 excluding the flange 42a.

The aforementioned fastening device 40 usually becomes one or integral unit by assembling the respective members in advance before being supplied to the attachment process of the toilet seat unit 3. An example of the assembling operation will be explained generally.

As shown in FIGS. 5 through 7, when the inclined outer surface 42e is inserted inside the inclined inner surfaces 46b or the expanding portion formed by the pieces 46 of the expanding member 43, the projections 46c are inserted into the spaces formed by the connection portions 45b (inner side of the vertical portion 45a). In a condition that the lower portions of the vertical portions 45a are located in the slit portions 43d, the projections 46c prevent the connection portions 45b from being pulled out, so that the abutting member 42 is assembled to be slightly movable up and down. Incidentally, although it is possible that the friction member 31 is attached to the pieces 46 of the expanding member 43 in advance, it is preferable to attach the friction member 31 in a condition shown in FIG. 6. Also, the bolt 41 is normally assembled in a condition that the abutting member 42 is attached to the expanding member 43, such that the axis portion 41b passes through the through-hole 42b and the inner peripheries of the pieces 46 of the expanding member 43, and is engaged with the female thread 44a of the nut portion 44. Therefore, in this structure, as compared to the first embodiment, since the nut portion 44 is formed integrally with the expanding member 43, assembling process is shortened or reduced.

Next, processes for fixing the toilet seat unit 3 to the toilet bowl by using the fastening device 20 or 40 will be explained with reference to FIG. 1 and FIG. 5, and operations thereof will be referred.

(1) In the attachment operations, as described earlier, normally, in a condition that the toilet seat unit 3 is placed on the attachment portion of the toilet bowl 1 with the installation plate 9 therebetween, positioning is made such that the attachment holes 9d are aligned with the attachment holes 1a. In case the fastening devices 20 or 40 are inserted into the attachment holes 9d and 1a to fasten, the installation plate 9 is finally positioned through the attachment holes 9d.

Then, the operator rotates the bolt 21 or 41 from the top.

(2) In the first embodiment, the nut member 24 ascends, and by pushing the expanding member 23 upwardly at the initial stage, the inclined outer surface 22d is pushed inside the inclined inner surface 23b, and simultaneously, the inclined outer surface 29b of the nut member 24 is pushed inside the inclined inner surface 23c. Thereafter, when the nut member 24 further ascends, the expanding member 23 is pushed from the upper and lower directions by the wedge action between the inclined inner surface 23b and the inclined outer surface 22d and by the wedge action between the inclined inner surface 23c and the inclined outer surface 29b. As a result, by the aforementioned respective wedge actions, the pieces 26 deform the connection pieces 27 to radially expand the diameter, and the expansion force is applied to the friction member 30 so that the friction member 30 is strongly pressed against the inner peripheral surface of the attachment hole 1a.

On the other hand, in the second embodiment, when the nut portion 44 starts ascending, at the initial stage, the pieces 46 forming the expanding member 43 are pushed upwardly in association with the nut such that the inclined outer surface 42e of the abutting member 42 is pushed inside the inclined inner surfaces 46b. Then, when the nut portion 44 further ascends, the diameter of the pieces 46 forming the expanding portion are expanded by the thin hinge portion 47, and simultaneously, the pieces 46 are pressed from the upper side by the wedge action between the inclined inner surfaces 46b and the inclined outer surface 42e, so that the diameter of the pieces 46 are expanded in the diametral direction. Accordingly, the diameter expansion force is applied to the friction member 31, so that the friction member 31 is strongly pressed against the inner peripheral surface of the attachment hole 1a.

(3) In these pressing examples, both in the first and second embodiments, the diameter expansion force of either the expanding member 23 or the pieces 46 forming the expanding portion is applied to the soft friction member 30 or 31, and by the cylindrical friction member 30 or 31, the diameter expansion force is equalized vertically and planarly, and the pressing force can be efficiently applied to the inner peripheral surface of the attachment hole 1a extensively in the diametral direction. The expanding member 23 in the first embodiment or the pieces 46 in the second embodiment expands its diameter in a condition of being sandwiched from the top and bottom. Also, the diameter expanding portion is the pieces 26 or 46 made of resin harder than rubber material, and the force is entirely transferred to the diametral direction. Thus, in this structure, the stronger fixation, which is stable in the aspect of the engaging strength, can be obtained instantly, and the final tightening point in the tightening operation of the bolt 21 or 41 can be easily realized.

(4) Incidentally, in the bolt 41 of the second embodiment, since the head 41a has a hexagonal shape, even if the engaging groove 41d is destroyed and deformed, the head 41a can be gripped by the tool to rotate, so that it is very convenient when the bolt is required to be detached or attached for the maintenance. In this type of the toilet seat unit 3, it is often cleaned, repaired or exchanged in a condition that the toilet seat unit 3 is taken off. In these cases, it is required to take off the installation plate 9. In case of taking off the installation plate 9, when the bolt 21 or 41 is rotated in a direction opposite to the direction in a case of tightening, the fastening device 20 or 40 returns to the original condition, and it is needless to say that the bolt can be easily pulled out from the attachment holes 1a and 9d.

(5) In the embodiments, since the members forming the fastening device 20 or 40 except the friction member 30 or 31 are formed of resin, there is no problem such as rust, and productivity is good. Also, in case that the expanding member 43 with the nut portion 44 is formed as in the second embodiment, there are advantages such that process for assembling the members is reduced, and handling the fastening device 40 becomes excellent.

Incidentally, although the friction member 30 or 31 in a cylindrical shape is used in the embodiments, a shape thereof can be variously modified. An example thereof is shown by a two-dotted line in FIG. 6. A friction member 32 includes a pair of pieces 32b disposed at the lower surface of the flange 32a, and is formed into a substantially cylindrical shape in a condition that slit portions 32c are interposed between the pieces 32b. Also, the flange 32a includes, for example, projections 32d corresponding to the dents 42d of the flange 42a provided in the abutting member 42 of the second embodiment. In a condition that the attachment hole 9d is aligned with the attachment hole 1a, the pieces 32b are inserted into the attachment holes 9d and 1a, and in the condition that the pieces are inserted into the attachment holes, the fastening device assembled as shown in FIG. 8 is inserted into the friction member 32. Accordingly, the flange 42a of the abutting member 42 is disposed on the flange 32a, and the dents are engaged and fitted with the projections 32d.

Further, as another embodiment, for example, in case that the attachment holes 9d and 1a are respectively formed of plural holes, e.g. two holes, it is possible that the aforementioned friction members 30, 31 or 32 with the same number of pieces as in the attachment holes, e.g. two pieces, may be integrally formed by a connection portion. Furthermore, the above described buffer member 10 may be connected with the friction member 30, 31 or 32 to reduce a number of the members or parts. Incidentally, although there has been explained that the fastening device is formed of a resin molded member in the aforementioned embodiments, the bolt 21 or 41 and the nut member 24 need not be limited to resin members in view of the cost or strength, and it can be formed of metal, or a compound of resin and metal.

As described above, in the toilet seat attachment structure according to the present invention, in accordance with the ascent of the nut member, the expanding member expands its diameter in the diametral direction in a condition that the expanding member is sandwiched between the abutting member and the nut member. The diameter expansion force can be planarly equalized by the soft friction member, and the pressing force can be applied extensively in the inner peripheral surface of the attachment hole. Accordingly, there can be obtained an engaging force which is strong and stable with respect to the engagement and strength, and the final point for tightening the bolt can be easily determined. Thus, workability is excellent even in the small place, and the toilet seat unit can be attached to the toilet bowl by the strong and stable engaging force.

While the invention has been explained with reference to the specific embodiments of the invention, the explanation is illustrative and the invention is limited only by the appended claims.

What is claimed is:

1. A toilet seat attachment structure for a toilet seat unit comprising:

an installation plate with an attachment hole for attaching the toilet seat unit to a toilet bowl with an attachment hole, and a fastening device fastened in the attachment hole of the toilet bowl after the attachment holes of the installation plate and the toilet bowl are aligned and the fastening device is inserted from an upper side of the installation plate into the attachment holes, said fastening device comprising, a bolt having an axis portion, an abutting member having a shaft portion with a tapered lower portion, a flange formed on an upper periphery of the shaft portion to abut against the toilet seat unit, and a through-hole formed in the shaft portion for allowing the axis portion of the bolt to pass therethrough, an expanding member situated adjacent to the abutting member and disposed around the axis of the bolt, said expanding member having an inclined inner wall portion with a diameter gradually decreasing from an upper end to an inside thereof, said inner wall portion receiving the tapered lower portion of the abutting member, a nut member engaging the axis portion for supporting the expanding member, said nut member ascending on the axis portion upon rotation of the bolt so that the expanding member gradually mounts on the abutting member to expand a diameter of the expanding member, and a friction member disposed outside the expanding member, said friction member, upon expansion of the diameter of the expanding member, enlarging a diameter to frictionally engage with the attachment hole of the toilet bowl so that when the bolt is turned, the expanding member is pressed against an inner periphery of the attachment hole of the toilet bowl through the friction member to firmly engage the toilet bowl.

2. A toilet seat attachment structure according to claim 1, wherein the fastening device is formed of resin.

3. A toilet seat attachment structure according to claim 1, wherein the expanding member and the nut member are integrally formed with resin.

4. A toilet seat attachment structure according to claim 1, wherein said expanding member includes at least two pieces and slit portions interposed between the two pieces, said pieces with the slit portiones forming one unit in a substantially cylindrical shape.

5. A toilet seat attachment structure according to claim 4, wherein said abutting member includes guide pieces disposed inside the slit portions of the expanding member, said abutting member being vertically movably attached to the expanding member by engaging the guide pieces and the slit portions in case a distal end of the abutting member is inserted into the expanding member.

6. A toilet seat attachment structure according to claim 1, wherein said toilet seat unit includes a notch for storing the installation plate at a lower rear surface thereof, a seat and an axis, said installation plate including a guide groove engaging the axis so that when the installation plate is fixed to the toilet bowl, the seat is slidable in front and rear directions on the toilet bowl.

7. A toilet seat attachment structure adapted to attach a toilet seat unit to a toilet bowl, comprising:

a bolt having an axis portion, an abutting member having a shaft portion with a tapered lower portion, a flange formed on an upper periphery of the shaft portion, and a through-hole formed in the shaft portion for allowing the axis portion of the bolt to pass therethrough, an expanding member situated adjacent to the abutting member and disposed around the axis of the bolt, said expanding member having an inclined inner wall portion with a diameter gradually decreasing from an upper end to an inside thereof, said inner wall portion receiving the tapered lower portion of the abutting member, a nut member situated adjacent to the expanding member and engaging the axis portion, said nut member ascending on the axis portion upon rotation of the bolt so that the expanding member mounted on the abutting member gradually expands an outer diameter, and a friction member disposed outside the expanding member, said friction member, upon expansion of the outer diameter of the expanding member, enlarging a diameter adapted to frictionally engage with an attachment hole of a toilet bowl.

8. A toilet seat attachment structure according to claim 7, wherein said expanding member is formed of at least two pieces spaced apart from each other and having slits and projections, said abutting member having guide pieces engaging the slits so that the abutting member is slidably assembled with the expanding member.

9. A toilet seat attachment structure according to claim 8, wherein said expanding member includes a lower inner wall portion with a diameter gradually reducing from a lower end to the inside thereof, and said nut member includes a tapered upper portion situated inside the lower inner wall portion so that when the nut member is tightened, the expanding member is enlarged by the nut member and the abutting member.

10. A toilet seat attachment structure according to claim 9, wherein said nut member includes guide pieces engaging the slits of the expanding member.

11. A toilet seat attachment structure according to claim 8, wherein said two pieces of the expanding member are integrally connected to the nut member through thin hinge portions.

12. A toilet seat attachment structure according to claim 7, wherein said friction member includes a flange and a plurality of elongated sections attached to the flange to form a cylindrical shape disposed outside the expanding member.

13. A toilet seat attachment structure according to claim 8, wherein said expanding member and the nut member are integrally formed with resin.

* * * * *